United States Patent [19]

Harvath et al.

[11] Patent Number: 5,014,300
[45] Date of Patent: May 7, 1991

[54] METHOD AND APPARATUS FOR ACCESSING A FACSIMILE STORE AND FORWARD NETWORK

[75] Inventors: Steven J. Harvath; Vernon O. Kilgore; Raymond K. Zapp, all of Portland, Oreg.

[73] Assignee: Atlas Telecom, Inc., Portland, Oreg.

[21] Appl. No.: 441,346

[22] Filed: Nov. 20, 1989

Related U.S. Application Data

[63] Continuation of Ser. No. 229,213, Aug. 5, 1988, abandoned.

[51] Int. Cl.$^5$ ...................... H04M 11/00; H04N 1/32
[52] U.S. Cl. .................................. 379/100; 379/221; 379/257; 379/355; 358/407; 358/440
[58] Field of Search ............... 379/100, 216, 220, 221, 379/257, 355; 358/402, 407, 440

[56] References Cited

U.S. PATENT DOCUMENTS

| | | | |
|---|---|---|---|
| 4,249,216 | 2/1981 | Kanda | 358/257 |
| 4,447,676 | 5/1984 | Harris et al. | 379/221 X |
| 4,524,393 | 6/1985 | Ohzeki | 358/257 |
| 4,586,086 | 4/1986 | Ohzeki | 358/256 |
| 4,607,289 | 8/1986 | Kurokawa | 358/257 |
| 4,646,160 | 2/1987 | Iizuka et al. | 358/257 |
| 4,649,533 | 3/1987 | Chorley et al. | 379/94 X |
| 4,652,700 | 3/1987 | Matthews et al. | 379/100 X |
| 4,675,742 | 6/1987 | Ogata | 358/257 |
| 4,741,021 | 4/1988 | Kotani et al. | 379/100 |
| 4,873,720 | 10/1989 | Son | 379/216 X |
| 4,905,273 | 2/1990 | Gordon et al. | 379/93 |

FOREIGN PATENT DOCUMENTS 61-276458 12/1986 Japan ........................... 379/355

OTHER PUBLICATIONS

T. Kamae, "Development of a Public Facsimile Communication System Using Storage and Conversion Techniques", IEEE National Telecommunications Conference, Houston, TX, USA, Nov. 30 to Dec. 4, 1980, pp. 19.4.1 to 19.4.5, CH1539-6/80/0000-0094; Copy in 379/100.

Primary Examiner—Jin F. Ng
Assistant Examiner—Wing F. Chan
Attorney, Agent, or Firm—Stoel Rives Boley Jones & Grey

[57] ABSTRACT

A facsimile store and forward network (42) includes a network access device (36) and an address processing unit (38) that cooperate to interface an originating facsimile machine (10) with a store and forward inbound node (40). The store and forward network provides communication between the originating facsimile machine and a receiving facsimile machine (12), both of which are capable of communicating in a point-to-point manner via a public switched telephone network (14). In operation, the network access device receives from the originating facsimile machine a first address signal that accesses the receiving facsimile machine, generates and stores address information corresponding the first address signal, and delivers to a message entry telephone network (16) a second address signal that accesses the address processing unit of the inbound node. The address processing unit delivers to the network access device a nodal identification signal, in response to which the network access device connects the originating facsimile machine to the message entry telephone network for the transmission of message data to the inbound node. The network access device and the address processing unit form a network interface system (34) that allows the originating facsimile machine to employ the store and forward network while being operated as if the message data were transmitted to the receiving facsimile machine in a point-to-point manner.

14 Claims, 7 Drawing Sheets

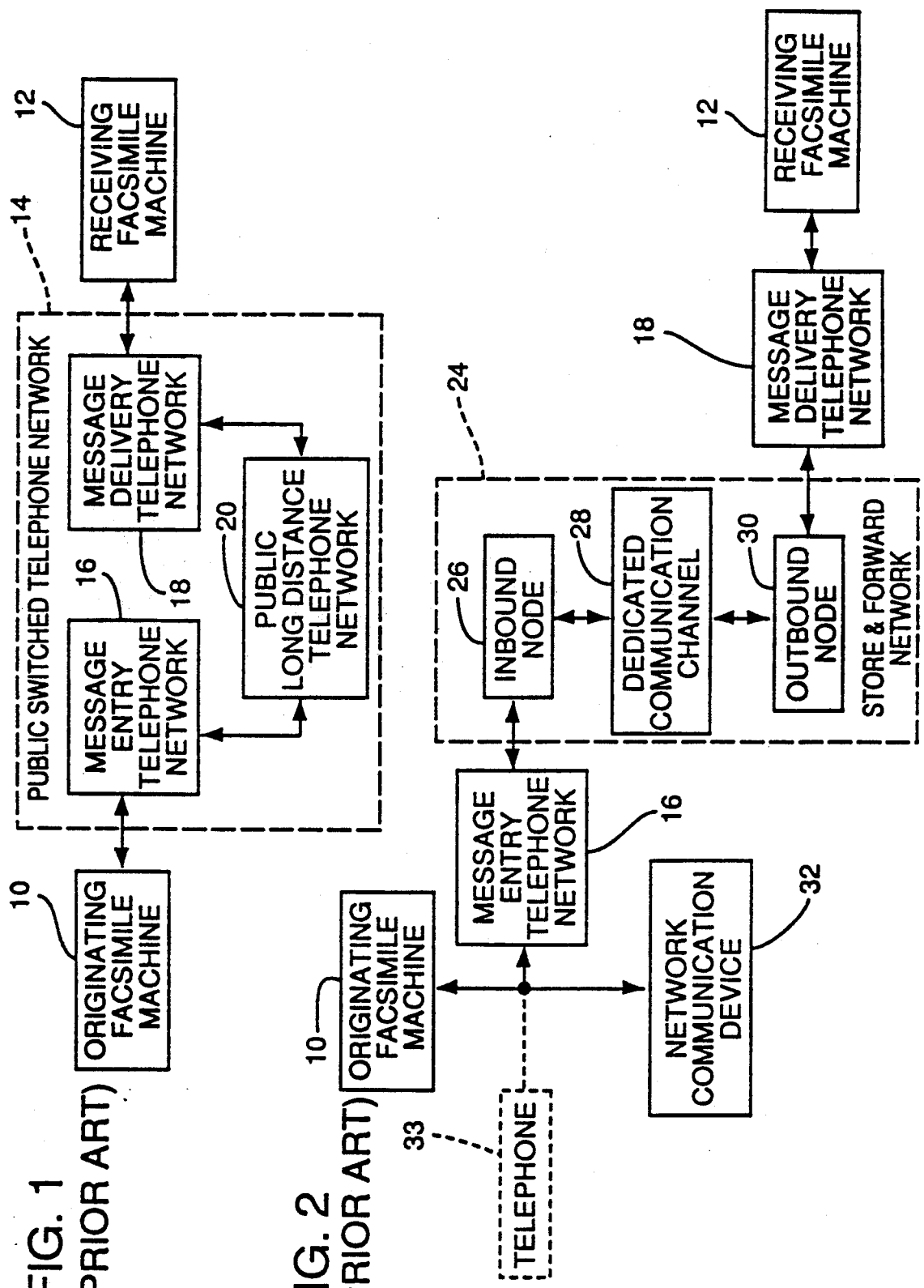

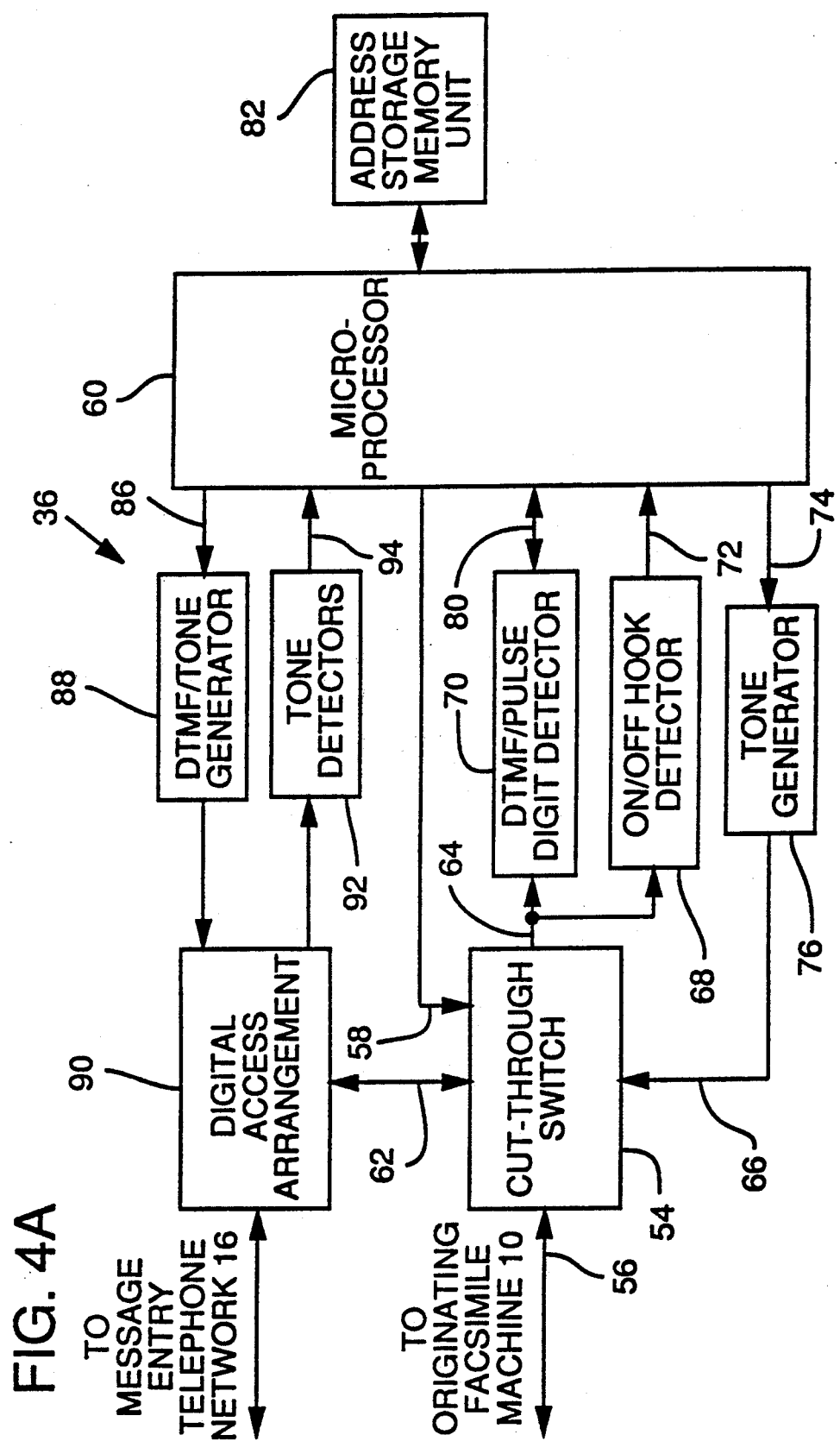

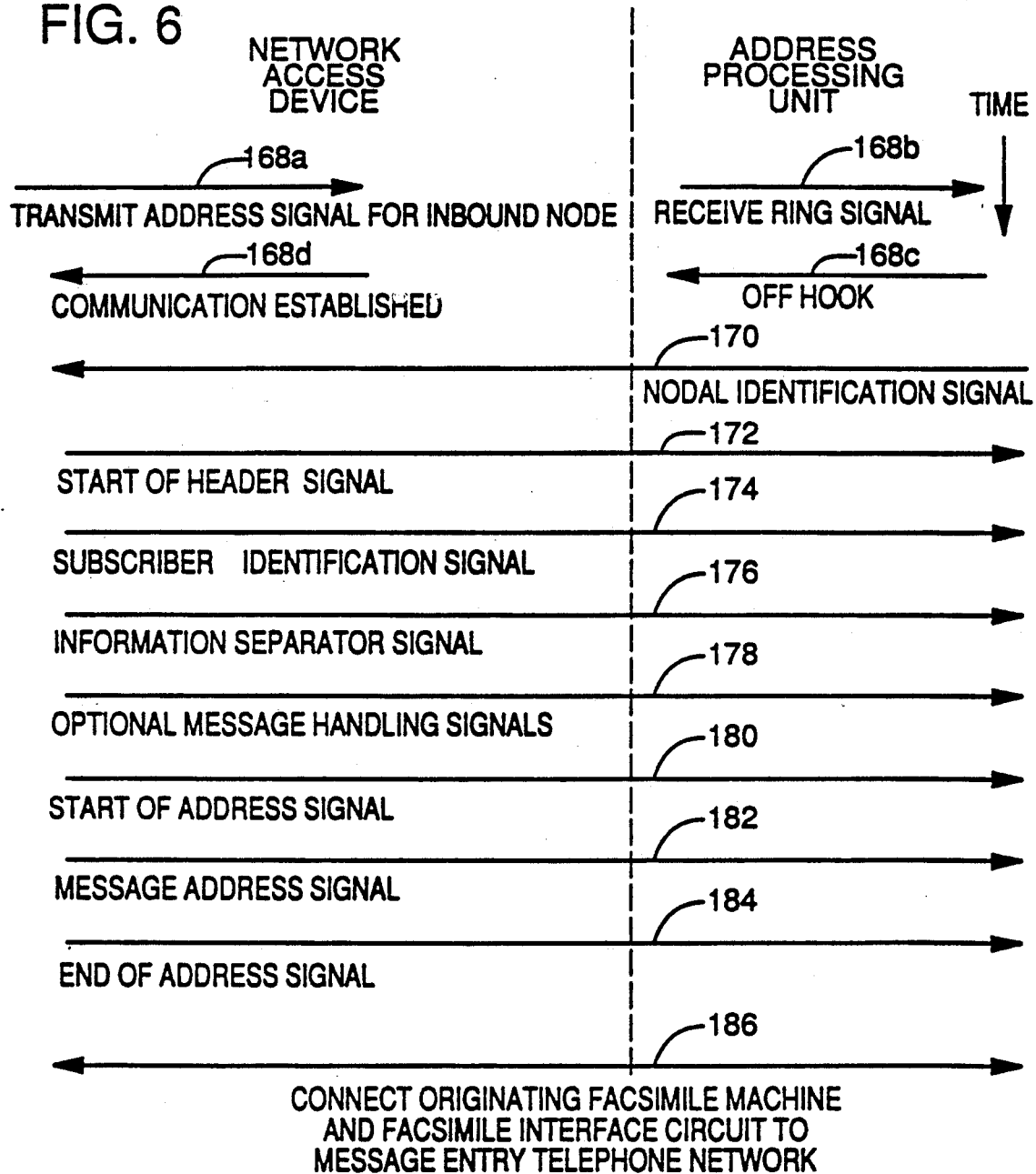

METHOD AND APPARATUS FOR ACCESSING A FACSIMILE STORE AND FORWARD NETWORK

This is a continuation of application Ser. No. 229,213, filed Aug. 5, 1988, now abandoned.

Technical Field

The present invention relates to facsimile store and forward networks that receive, stop, and transmit message data generated by an originating facsimile machine and, in particular, to a network interface system through which an originating facsimile machine accesses such a store and forward network.

BACKGROUND OF THE INVENTION

FIG. 1 shows a conventional facsimile communication system in which message data are transmitted in "point-to-point" fashion directly from an originating facsimile machine 10 to a receiving facsimile machine 12 via a public switched telephone network (PSTN) 14. In long distance facsimile communication, PSTN 14 include a message entry telephone network 16 and a message delivery telephone network 18 connected together by a public long distance telephone network 20. Message entry telephone network 16 receives data from originating facsimile machine 10, and message delivery telephone network 18 delivers data to receiving facsimile machine 12. Telephone networks 16 and 18 are typically the public switched local calling networks within which the respective facsimile machines 10 and 12 are located.

Originating facsimile machine 10 accesses receiving facsimile machine 12 by transmitting over the PSTN 14 an address signal corresponding to the telephone number of receiving facimile machine 12. The address signal and telephone number of receiving facsimile machine 12 are sometimes referred to as "destination information." The address signal is generated either by an automatic dialer included in originating facsimile machine 10 or by a facsimile machine operator manually dialing the telephone number.

Point-to-point communication between facsimile machines 10 and 12 occurs either within a single local calling network or across a long distance telephone network. Point-to-pont facsimile communication within a single local calling network is typically inexpensive. On the other hand, long distance and, in particular, international point-to-point facsimile communication can be relatively costly. The reason is that facsimile communication frequently occurs during business hours, which are typically the times when the charges for using a public long distance telepohone networks are greatest.

FIG. 2 shows a prior art facsimile store and forward network 24 that is capable of less expensive long distance facsimile communication than is the point-to-point facsimile communication described with reference to FIG. 1. Store and forward network 24 takes the place of public long distance telephone network 20 of FIG. 1 and includes an inbound node 26 and a dedicated long distance telephone communication channel or network 28 that provides long distance communication between inbound node 26 and an outbound node 30. Inbound node 26 is in the local calling area of facsimile machine 10, and outbound node 30 is preferably in the local calling area of receiving facsimile machine 12.

Store and forward network 24 is capable of providing comparatively inexpensive long distance facsimile communication because of the combined benefits of employing dedicated communication channel 28 and transmitting a substantial amount of message data via the communication channel. More specifically, a dedicated communication channel may be established between two points (e.g., inbound node 26 and outbound node 30) by, for example, leasing the channel from a telecommunication network at a fixed "wholesale" rate. Whenever a sufficient amount of message data (e.g., message data generated by multiple subscribers to store and forward network 24) are transmitted via communication channel 28, the cost per unit of message data transmitted via store and forward network 24 is less than the "retail" long distance charges associated with point-to-point communication.

Originating facsimile machine 10 cooperates with a network communication device 32 to transmit message data, destination information, and subscriber identification information to inbound node 26 via message entry telephone network 16, as will be described below in greater detail. Inbound node 26 transmits the message data and the destination information via communication channel 28 to outbound node 30, which employs the destination information to access receiving facsimile machine 12 via message delivery telephone network 18. Once communication is established between outbound node 30 and receiving facsimile machine 12, the message data are delivered to the receiving facsimile machine.

The addressing method by which originating facsimile machine 10 is interfaced with inbound node 26 differs from the addressing method employed in point-to-point communication. A first stage of the former addressing method includes the step of transmitting over message entry telephone network 16 an address signal corresponding to the telephone number of inbound node 26 to establish communication between the node and originating facsimile machine 10. A second stage of the addressing method includes the step of transmitting to inbound node 26 the subscriber identification information and the address signal corresponding to the telephone number of receiving facsimile machine 12 (i.e., the destination information).

The transmission of the subscriber identification information and destination information is typically initiated by the facsimile machine operator in response to prompts received from inbound node 26. The information is transmitted over message entry telephone network 16 either by an automatic dialer (not shown) included in network communication device 32 or by the facsimile machine operator manually entering the information with the DTMF generating touch-tone ® keypad of a telephone 33 that is connected to message entry telephone network 16 with originating facsimile machine 10.

Once the addressing procedure is completed, the facsimile machine operator manually initiates transmission of the message data from originating facsimile machine 10 to inbound node 26. Originating facsimile machine 10 is operated in such a manual mode because the automatic addressing system of the facimile machine is typically incompatible with the addressing requirments of store and forward communication. The manual mode allows the facsimile machine operator to employ network communication device 32 to perform the addressing procedure without being disrupted by the addressing signals that would be generated by originating facimile machine 10 if it were operated in an automatic mode.

Most subcribers to store and forward network 24 selectively employ point-to-point facsimile communication and communication via store and forward network 24 for different facsimile transmissions. The addressing method employed in point-to-point facsimile communication includes the step of transmitting from originating facsimile machine 10 the address signal for receiving facsimile machine 12. In the two-stage addressing method of store and forward network 24, network communication device 32 or telephone 33 is used to transmit the destination information. These different operating procedures for point-to-point communication and communication via store and forward network 24 can require subscribers to change operating procedures that were established for point-to-point communication only. Moreover, facsimile machine operators would need to be trained to implement both procedures and to determine which of the two types of communication should be employed for each facsimile transmission. Such requirements are undesirable because implementation of them could be inconvenient for the subscribers to the store and forward network.

SUMMARY OF THE INVENTION

An object of the present invention is, therefore, to provide a network interface system through which an originating facsimile machine interfaces with a store and forward network.

Another object of this invention is to provide such a system in which the operating procedures for transmitting message data via the store and forward network are similar to those employed in point-to-point facsimile communication.

A further object of this invention is to provide such a system in which a store and forward network is accessed in a manner that is "transparent" to the operator of the originating facsimile machine.

The present invention is a method and an apparatus for interfacing an originating facsimile machine with a facsimile store and forward network. The store and forward network includes and inbound node that is accessed by a first telephone network address signal and is preferably in the local calling area of the originating facsimile machine, an outbound node that is preferably in the local calling area of a receiving facsimile machine, and a dedicated long distance telephone communication channel or network that provides long distance communication between the inbound node and the outbound node.

The present invention includes a network access device connected between the originating facsimile machine and a message entry telephone network. To transmit message data from the originating facsimile machine to a receiving facsimile machine via the store and forward network, the originating facsimile machine transmits a second telephone network address signal corresponding to the telephone number of the receiving facsimile machine in a manner similar to that employed in point-to-point communication. The second telephone network address signal is intercepted by the network access device, which generates and stores in accordance with the signal binary digital data representing the telephone number of the receiving facsimile machine. The network access device then transmits over the message entry telephone network the first telephone network address signal and thereby establishes communication with the inbound node.

The inbound node includes an address processing unit that communicates with the message entry telephone network and cooperates with the network access device for interfacing the originating facsimile machine and the inbound node. The network access device establishes communication with the address processing unit by transmitting the first telephone network address signal. After the communication is established, the address processing unit of the inbound node transmits a nodal identification signal to the network access device indicating that it is connected with an inbound node. In response to the nodal identification signal, the network access device automatically generates from stored binary digital data the subscriber identification information and a third telephone network address signal that is a replica of the second telephone network address signal and that represents the destination information. The subscriber identification information and destination information are delivered to the address processing unit via the message entry telephone network. The network access device then connects the originating facsimile machine to the message entry telephone network for the transmission of the message data to the inbound node.

The network interface system of the present invention allows the operator of the facsimile machine to employ substantially the same operating procedures for point-to-point communication and communication via the store and forward network. In particular, the telephone number of the receiving facsimile machine is entered into and transmitted from the originating facsimile machine in both types of communication. As a result, access to the store and forward network is established automatically by the network access device, thereby making the store and forward network "transparent" to the operator of the originating facsimile machine.

Additional objects and advantages of the present invention will be apparent from the detailed description of a preferred embodiment thereof, which proceeds with reference to the accompanying drawings.

BRIEF DESCRIPTION OF THE DRAWINGS

FIG. 1 is a schematic block diagram of a prior art point-to-point facsmile communication system.

FIG. 2 is a schematic block diagram of a prior art facsimile store and forward network.

FIGS. 4A and 4B are respective schematic block and flow diagrams relating to a network access device employed in the interface system of FIG. 3.

FIG. 6 is a schematic diagram of the communication protocol employed between the network access device of FIG. 4A and the address processing unit of FIG. 5A.

DETAILED DESCRIPTION OF PREFERRED EMBODIMENT

Figure 3:
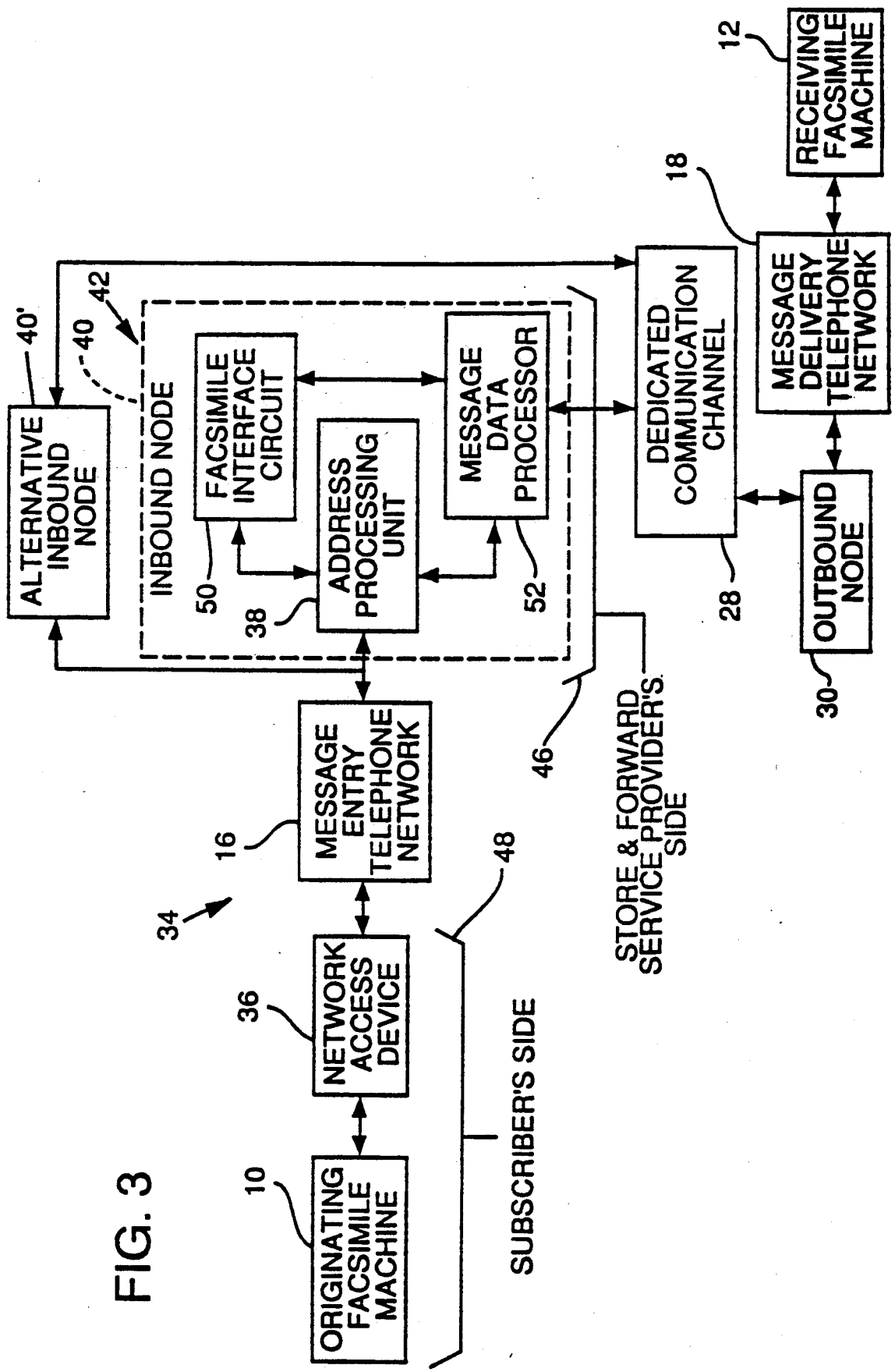
FIG. 3 is a schematic block diagram showning the network interface system of the present invention in communication with a originating facsimile machine and a store and forward network.

FIG. 3 shows a network interface system 34, which includes a network access means or device 36, and an address processing means or unit 38. Network interface system 34 interfaces originating facsimile machine 10 with an inbound node 40. Address processing unit 38 is a component of inbound node 40, which is a component of a facsimile store and forward network 42. Address processing unit 38 is located, therefore, on a store and forward service provider's side 46 of telephone network 16. Network access device 36 is connected between originating facsimile machine 10 and message entry telephone network 16 nad is located, therefore, on a subscriber's side of 48 of telephone network 16.

A facsimile interface circuit 50 and a message data processor 52 of inbound node 40 communicate with each other and with address processing unit 38 to process information received from originating facsimile machine 10, as will be described below in greater detail. Such information is transmitted from message data processor 52 to receiving facsimile machine 12 via communication channel 28, outbound node 30, and message delivery telephone network 18, in a manner similar to that described with reference to store and forward network 24 of FIG. 2.

FIG. 4A is a schematic block diagram of network access device 36, which is preferably a programmable communications controller such as, for example, Model No. 8350-001 manufactured by Mitel Datacom Inc. of Herndon, VA. Such controllers are designed to provide an interface between a long distance common carrier telephone network and, for example, a private branch exchange (PBX). In particular, the controller is typically programmed to transmit common carrier access codes by which a caller from a PBX accesses the long distance common carrier telephone network for voice communication. As employed network for voice communication. As however, the communications controller (i.e. network access device 36) has been programmed for interfacing originating facsimile machine 10 with store and forward network 42.

With reference to FIG. 4A, network access device 36 includes a "cut-through" switch 54 having a first data path 56 connected to originating facsimile machine 10. In response to the logic state of a control signal applied to a control input 58 by a microprocessor 60, cut-through switch 54 selectively connects frist data path 56 either to a second data path 62 or to a pair of third data paths 64 and 66.

As will be described below in greater detail, cut-through switch 58 connects data path 56 to data paths 64 and 66 in response to a control signal in a first logic state to allow network access device 36 to process information received from originating facsimile machine 10. Similarly, cut-through switch 58 connects data path 56 to data path 62 in response to a control signal in a second logic state for transmitting to facsimile interface circuit 50 message data generated by originating facsimile machine 10.

Whenever cut-through switch 54 connects data path 56 to data paths 64 and 66, information received at data paths 56 from originating facsimile machine 10 is delivered to an on/off hook detector 68 and a dual tone multifrequency (DTMF)/pulse digit detector 70 that are connected to data path 64. The information received at data path 56 includes, for example, off-hook signals and address signals that are generatd by originating facsimile machine 10 in connection with the transmission of a facsimile message.

On/off hook detector 68 receives the off-hook signal generated by originating facsimile machine 10 and generates in response to the signal an off-hook logic state that is delivered to an input 72 of microprocessor 60.

The off-hook logic state causes microprocessor 60 to deliver a tone generation control signal to control input 74 of a tone generator 76, which generates in response to the control signal a dial tone that is delivered to originating facsimile machine 10 via data path 66 of cut-through switch 54.

In response to the dial tone generated by tone generator 76, originating facsimile machine 10 delivers to data path 56 a telephone network address signal that corresponds to the telephone number of receiving facsimile machine 12. Originating facsimile machine 10 is programmed to generate the telephone network address signal is in a manner similar to that employed in point-to-point communication. The telephone network address signal is sometimes referred to as "destination information."

DTMF/pulse digit detector 70 receives the address signal from data path 64 of cut-through switch 54 and generates binary digital data that represent the telephone number of receiving facsimile machine 12. The binary digital data are delivered to input 80 of microprocessor 60, which stores the data in an address storage memory unit 82.

In addition to storing the data, microprocessor 60 evaluates the data to determine whether the facsimile message should be transmitted to receiving facsimile machine 12 in a point-to-point manner or via store and forward network 42. For example, microprocessor 60 could be programmed to transmit domestic and international facsimile communications in a point-to-point manner and via store and forward network 42, respectively. Microprocessor 60 could distinguish such communications by detecting whether the address signal of receiving facsimile machine 12 includes an international access code prefix (e.g., the prefix "011").

The evaluation of the telephone number of receiving facsimile machine 12 by microprocessor 60 allows network access device 36 to automatically select between point-to-point communication and communication via store and forward network 42. As a result, the operating procedures for these two types of facsimile communication are substantially the same, thereby making access to store and forward network 42 "transparent" to the operator of originating facsimile machine 10.

Whenever the telephone number of receiving facsimile machine 12 corresponds to ta location that is to be accessed via store and forward network 42 (e.g., for an internatioinal facsimile communication), microprocessor 60 delivers to an input 86 of a dual tone multifrequency DTMF/tone generator 88 binary digital data that represent the telephone number of address processing unit 38 of inbound node 40. DTMF/tone generator 88 generates an address signal corresponding to the telephone number and transmits the address signal to message entry telephone network 16 via a public switched telephone network (PSTN) digital access arrangement 90. Digital access arrangement 90 is a conventional interface circuit that satifies requirements under Part 68 of the Federal Communication Commission regulations regarding telephone interfaces such as, for example, digital access arrangement model RDAA manufactured by Rockwell International.

Whenever it is accessed by network access device 36, address processing unit 38 transmits a nodal identification signal from which a tone detector circuit 92 of network access device 36 generates binary digital identification data that are delivered to an input 94 of microprocessor 60. In response to the nodal identification data, microprocessor 60 delivers binary digital data that represent subscriber identification information and the telephone number of receiving facsimile machine 12 to DTMF/tone generator 88 for transmission to inbound node 40. Microprocessor 60 delivers a control signal in a second logic state to control input 58 of cut-through switch 54, thereby connecting data paths 56 and 62. As a result, message data generated by originating facsimile machine 10 are delivered to digital access arrangement 90 for transmission to address processing unit 38 via message entry telephone network 16.

Whenever the telephone number of receiving facsimile machine 12 corresponds to a location that is to be accessed in a point-to-point manner (e.g., for a noninternational or domestic facsimile communication), microprocessor 60 and DTMF/tone generator 88 cooperate to transmit the address signal for receiving facsimile machine 12 over message receving telephone network 16. Microprocessor 60 also delivers a control signal in the second logic state to control input 58 of cut-through switch 54, thereby to connect data paths 56 and 62. As a result, message data generated by originating facsimile machine 10 are delivered to digital access arrangement 90 for transmission to receiving facsimile machine 12 via public switched telephone network 14 (FIG. 1).

Network access device 36 is configured to allow originating facsimile machine 10 to receive in an uninterrupted manner message data generated by other facsimile machines and delivered via telephone network 16. In particular, data paths 62 and 56 of cut-through switch 54 cooperates to deliver to originating facsimile machine 10 signals and message data that digital access arrangement 90 receives from telephone network 16. As a result, an incoming facsimile message is delivered directly to originating facsimile machine 10 from telephone network 16, thereby allowing originating facsimile machine 10 to receive the incoming message in an uninterrupted manner.

Figure 4B:
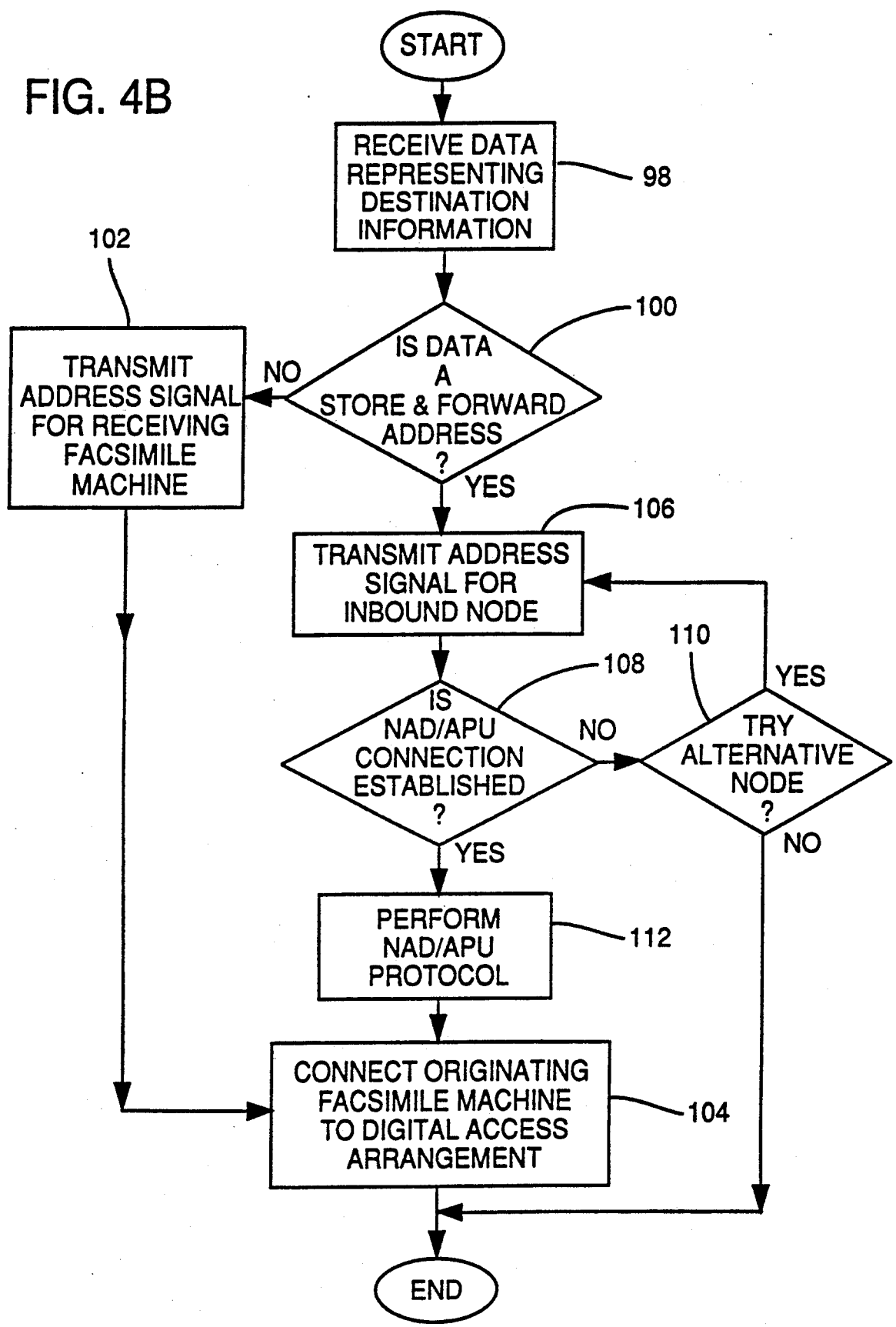

FIG. 4B is a flow diagram showing the operation of network access device 36. The process represented by the flow diagram starts when DTMF/pulse digit detector 70 generates the binary digital data representing the telephone number of receiving facsimile machine 12.

With reference to FIGS. 4A and 4B, process block 98 indicates that microprocessor 60 receives the binary digital data representing the telephone number of receiving facsimile machine 12.

Decision block 100 represents an inquiry as to whether the telephone number of receiving facsimile machine 12 corresponds to a location that is accessed by store and forward network 42. Whenever the telephone number of receiving facsimile machine 12 corresponds to a location not accessed by store and forward network 42, decision block 100 proceeds to process block 102. Whenever the telephone number of receiving facsimile machine 12 corresponds to a location accessed by store and forward network 42, decision block 100 proceeds to process block 106.

Process block 102 indicates that microprocessor 60 and DTMF/tone generator 88 cooperate to deliver the address signal of receiving facsimile machine 12 to message entry telephone network 16, thereby to establish communication with receiving facsimile machine 12 in a point-to-point manner. Under such circumstances, originating facsimile machine 10 communicates with receiving facsimile machine 12 via public switched telephone network 14 (FIG. 1).

Process block 104 indicates that cut-through switch 54 connects originating facsimile machine 10 to digital access arrangement 90 for the transmission of message data from originating facsimile machine 10 over message entry telephone network 16 to the location accessed by microprocessor 60 and DTMF/tone generator 88.

Process block 106 indicates that microprocessor 60 and DTMF/tone generator 88 cooperate to deliver to message entry telephone network 16 the address signal coresponding to inbound node 40, thereby to establish commuication with store and forward network 42.

Decision block 108 represents an inquiry as to whether communication between network access device 36 and address processing unit 38 is established. Whenever communication between network access device 36 and address processing unit 38 is not established, decision block 108 proceeds to decision block 110. Whenever communication between network access device 36 and address processing unit 38 is established, decision block 108 proceeds to process block 112. Reasons for which network access device 36 cannot establish communication with inbound node 40 include, for example, the circusstances under which all of the communication circuits of inbound node 40 are busy or equipment has failed at inbound node 40.

Decision block 110 represents an inquiry as to whether network access device 34 should attempt to establish communication with an alternative inbound node 40' (FIG. 3) of store and forward network 42. Store nad forward network 42 includes inbound node 40 and multiple alternative inbound nodes 40' (only one shown) that are similar to inbound node 40. Network access device 36 and originating facsimile machine 10 typically communicate with inbound node 40 but are capable, however, of establishing communication with any one of the multiple alternative inbound nodes 40' to complete the facsimile transmission via store and forward network 42. The alternative inbound nodes 40' are the nodes of store and forward network with which subscribers other than the one operating originating facsimile machine 10 typically communicate. The decision as to whether communication with an alternative inbound node 40' should be attempted is based upon the relative costs of point-to-point communication and communication via store and forward network 42.

Whenever communication with alternative inbound node 40' is not to be attempted, the processing sequence ends. Whenever communication with an alternative inbound node 40' is to be attempted, the processing sequence returns from decision block 110 to process block 106 for the transmission of the address signal corresponding to the alternative inbound node 40'. The address signal for alternative inbound node 40' is generated from digital data stored in memory unit 82 in a manner similar to that in which the address signal for inbound node 40 is generated.

Process block 112 indicates that a "handshake" protocol is performed between network access device 36 and address processing unit 38 once communication between them is established, as will be described below in greater detail. Process block 112 proceeds to process block 104 to connect originating facsimile machine 10 with digital access arrangement 90 for the transmission of the message data to inbound node 40.

Figure 5A:
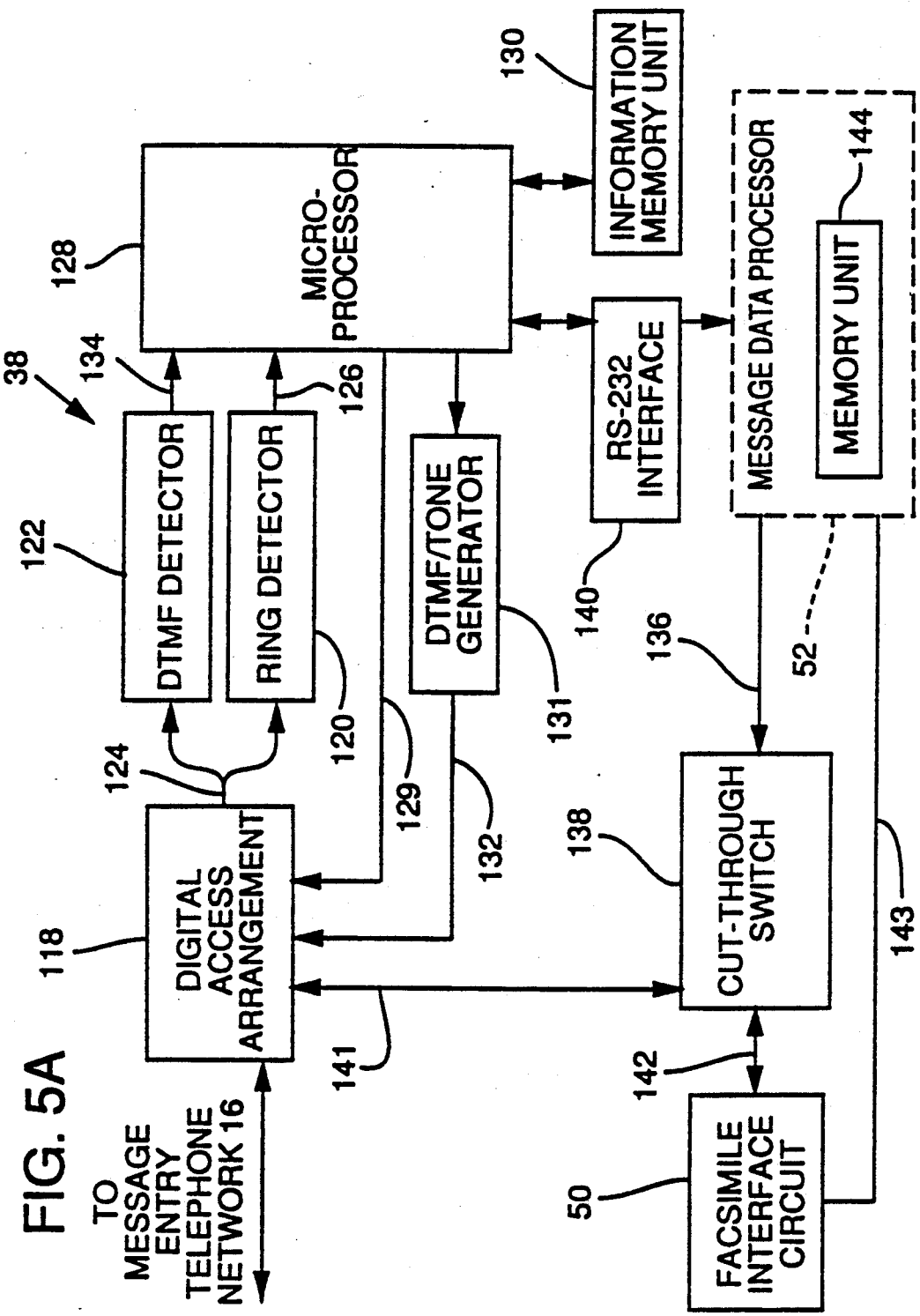
FIGS. 5A and 5B are respective schematic block and flow diagrams relating to an address processing unit employed in the interface system of FIG. 3.

FIG. 5A is a schematic block diagram of the address processing unit 38 that communicates with network acccess device 36 for interfacing originating facsimile machine 10 with inbound node 40. With reference to FIG. 5A, address processing unit 38 includes a public switched telephone network (PSTN) digital access arrangement 118 that is similar to digital access arrangement 90 of network access device 36. Digital access arangement 118 is connected to message entry telephone network 16 and receives from it information transmitted by originating facsimile machine 10 and network access device 36.

A ring signal detector 120 and a dual tone multifrequency (DTMF) digit detector 122 are connected to a first data path 124 of digital access arrangement 118. Ring signal detector 120 detects the ring signal generated whenever network access device 36 transmits the address signal corresponding to inbound node 40. In response to the ring signal, rign signal detector 120 delivers a ring logic state to an input 126 of a microprocessor 128. Microprocessor 128 generates an off-hook logic state that is delivered to a data path 129 of digital access arrangement 118 and directs it to establish an off-hook state on message entry telephone network 16. Microprocessor 128 also transfers binary digital data form an information memory unit 130 to a DTMF/tone generator 131, which generates in response to the data a nodal identification signal that is delivered to a data path 132 of digital access arrangment 118 for transmission to network access device 36 via message entry telephone network 16.

In response to the nodal identification signal, microprocessor 60 and DTMF/tone generator 88 of network access device 36 cooperate to transmit to address processing unit 38 the subscriber idfentication signal and the address signal for receiving facsimile machine 12. Microprocessor 60 then delivers a control signal of a second logic state to control input 58 of cut-through switch 54 so that the message data generated by originating facsimile machine 10 are delivered to digital access arrangement 90 for transmission to inbound node 40 via message receiving telephone network 16.

DTMF digit detector 122 of address processing unit 38 generates binary digital data corresponding to the subscriber identification signal and the address signal transmitted from network access device 36. The binary digital data are delivered to an input 134 of microprocessor 128, which delivers the data to message data processor 52 via an RS-232 interface 140. Message data processor 52 evaluates the binary digital data to determine whether it indicates that message data will be transmitted to inbound node 40.

Whenever message data are to be transmitted to inbound node 40 (i.e., whenever the binary digital data correspond to subscriber identification information and destination information), message data processor 52 applies a control signal in a first logic state to a control input 136 of a cut-through switch 138, which connects its data paths 141 and 142 so that the message data generated by originating facsimile machine 10 are delivered to facsimile interface circuit 50. Whenever message data are not to be transmitted to inbound node 40 (e.g., whenever the binary digital data correspond to a request from the store and forward network subscriber for a billing summary), message data processor 52 directs microprocessor 128 to deliver a disconnect signal to message entry telephone network 16. Message data processor 52 then processes the request so that, for example, the billing summary is transmitted to the subscriber at a different time.

The message data received by facsimile interface circuit 50 is transmitted over a data bus 143 to a built memory storage unit 144 of message data processor 52. Message data processor 52 correlates the message data with the subscriber identification and destination informatoin received from microprocessor 128. The subscsriber identification information is used by the store and forward service provider to identify the facsimile communication for billing and other purposes.

With reference to FIG. 3, the destination information is transmitted with the message data to outbound node 30 via dedicated communication channel 28. Outbound node 30 uses the destination information to transmit the message data to receiving facsimile machine 12 via message delivery telephone network 18.

Figure 5B:
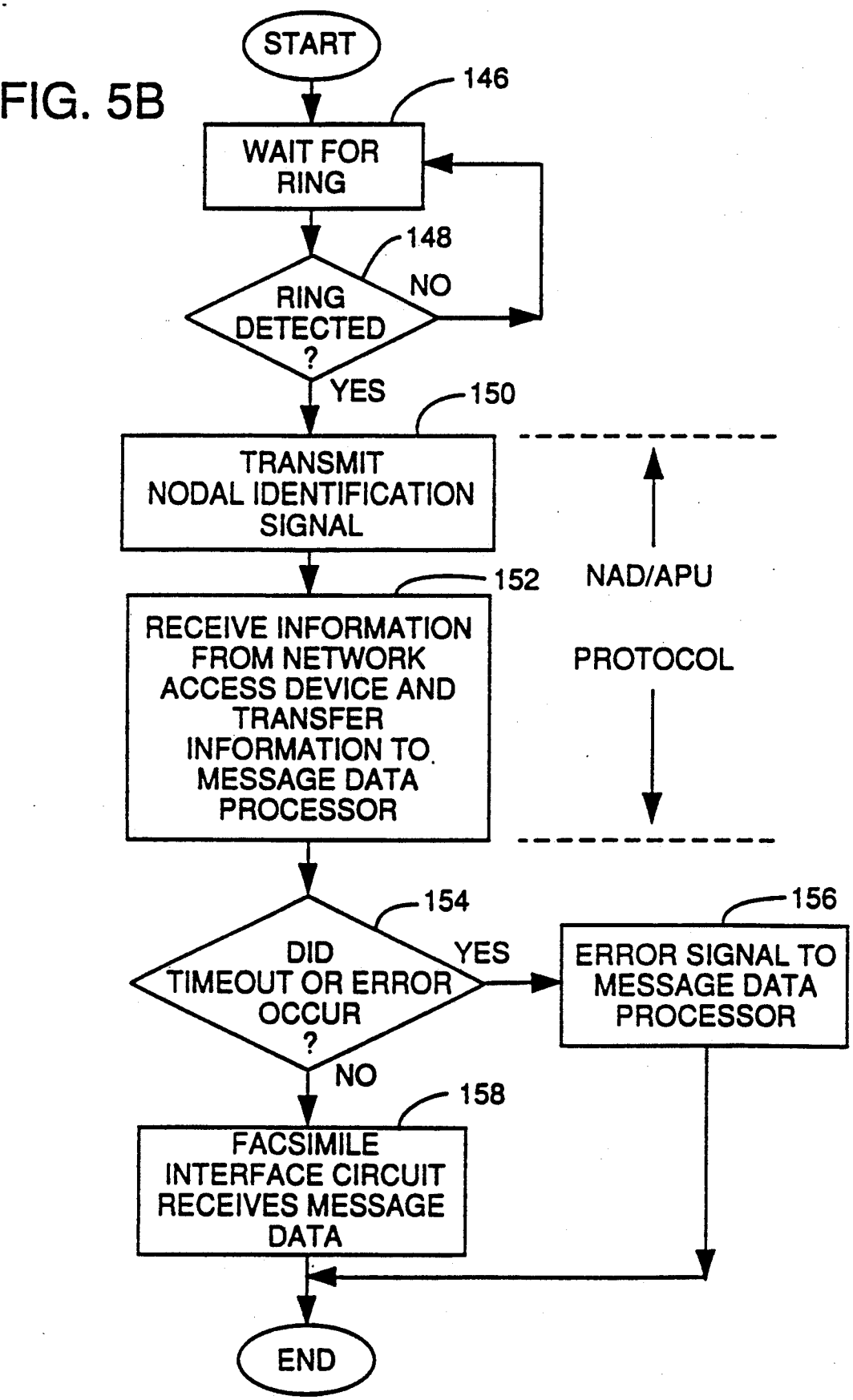

FIG. 5B is a flow diagram showing the operation of the address processing unit 38 of FIG. 5A. With reference to FIGS. 5A and 5B, process block 146 indicates that address processing unit 38 is awaiting a ring signal.

Decision block 148 represents an inquiry as to whether ring detector 120 has detected a ring signal. Whenever no ring signal has been detected, the processing sequence returns from decision block 148 to process block 146. Whenever a ring signal is detected, the processing sequence proceeds from decision block 148 to process block 150.

Process block 150 indicates that microprocessor 128 and DTMF/tone generator 131 cooperate to transmit the nodal identification signal to network access device 36 via message entry telephone network 16.

Process block 152 indicates that DTMF detector 122 receives from network access device 36 information that includes the subscriber identification signal and the message adress signal for receiving facsimile machine 12. The information is transferred to message data processor 52 via RS-232 interface 140 in a real-time manner. The exchange of information indicated by process blocks 150 and 152 represents a portion of the handshake protocol between address processing unit 38 and network access device 36, as will be described below in greater detail.

Decision block 154 represents an inquiry as to whether an error occurred during the handshake protocol. Such errors inlcude "time out" errors, which are caused by telephone line disconnects or aborted transmissions. Whenever any error does occur during the handshake protocol, the processing sequence proceeds from decision block 154 to process block 156. Whenever no errors occur during the handshake protocol, the processing sequence proceeds from decision block 154 to process block 158.

Process block 156 indicates that an error signal is delivered to message data processor 52, which either notifies a store and forward operator of the error or records a notice of the error in a network log.

Process block 158 indicates that cut-through switch 138 connects message entry telephone network 16 with facsimile interface circuit 50 so that it receives the message data generated by originating facsimile machine 10. The message data are transferred via data bus 143 to memory unit 144 of message data processor 52 and are correlated with the information received during the step represented by process block 152.

FIG. 6 is a diagram showing the sequence of events that occur in the handshake protocol between network access device 36 and address processing unit 38. Before the protocol is initiated, network access device 36 establishes communication with addressing processing unit 38. In particular, network access device 36 generates the address signal for inbound node 40 (step 168a). Address processing unit 38 receives a ring signal via message entry telephone network 16 (step 168b) and enters an off-hook state (step 168c), which indicates to network access device 36 that communication with address processing unit 38 has been established (step 168d).

Protocol step 170 indicates that address processing unit 38 transmits the nodal identification signal to network access device 36. The nodal identification signal serves as a confirmation that network access device 36 is in communication with an inbound node of store and forward network 42.

Protocol step 172 indicates that network access device 36 transmits a start of header signal to address processing unit 38. The "start of header" signal indicates to microprocessor 128 of address processing unit 38 that subscriber identification and destination information are to be transmitted.

Protocol step 174 indicates that the subscriber identification signal is transmitted from network access device 36 to address processing unit 38.

Protocol step 176 indicates that network access device 36 transmits an "information separator" signal to address processing unit 38. The information separator signal indicates to microprocessor 128 of address processing unit 38 that the subscriber identification signal has ended and that other information will be transmitted.

Protocol step 178 indicates that optional message handling singals area transmitted from network access device 36 to address processing unit 38. The optional message handling signals provide store and forward network 42 with the capability to provide additional services to its subscribers. For example, the optional message handling signals can specify multiple destinations to which the message data area to be transmitted, include destination speed codes which provide a means for abbreviating commonly used telephone network address signals, include destination group codes that identify a selected group of recipients with a single code, specify a delayed delivery time for a specified destination, and specify a message transmission priority. Such optional message handling signals represent add-on services that can be performed by the store and forward service provider for its subscribers. It will be appreciated that some optional message handling signals could cause various ones of the other protocol steps to be bypassed.

Protocol step 180 indicates that network access device 36 transmits a "start of address" signal to address processing unit 38. The start of address signal indicates to microprocessor 128 that the destination inforamtoin is about to be transmitted.

Protocol step 182 indicates that network access device 36 tansmits the destination information to address processing unit 38.

Protocol step 184 indicates that network access device 36 transmits an "end of address" signal to address processing unit 38. The end of address signal indicates to microprocessor 128 that all of the header information has been transmitted to address processing unit 38.

Protocol step 186 indicates that cut-through switch 54 of network access device 36 connects originating facsimile machine 10 to message receiving telephone network 16, and that cut-through switch 138 of address processing unit 38 connects facsimile interface circuit 50 to telephone network 16, thereby allowing the message data to be transferred from originating facsimile machine 10 to inbound node 40.

It will be obvious to those having skill in the art that many changes may be made in the above-described details of the preferred embodiment of the present invention without departing from the underlying principles thereof. For example, each one of the nodes 30 and 40 could be configured to operate as both an inbound node and an outbound node, thereby to provide a "reversible" store and forward network. The scope of the present invention should be determined, therefore, only by the following claims.

What is claimed is:

1. In a facsimile store and forward network that includes an inbound node that communicates with a first public switched telephone network and is accessed by a first public switched telephone network address signal for receiving message data generated by a first facsimile machine and for directing the message data to a second facsimile machine that communicates with a second public switched telephone network and is accessed by a second public switched telephone network address signal, a method of transmitting the message data from the first facsimile machine to the second facsimile machine, comprising:

directing the second public switched telephone network address signal from the first facsimile machine to a network access device disposed in data communication between the first facsimile machine and the first public switched telephone network;

transmitting the first public switched telephone network address signal from the network access device to the first public switched telephone network to access the inbound node;

transmitting a nodal identification signal to the network access device from an address processing unit within the inbound node and in data communication with the first public switched telephone network, the nodal identification signal comfirming that the inbound node has been accessed;

transmitting from the network access device to the address processing unit the second public switched telephone network address signal and a subscriber identification signal identifying the first facsimile machine as a subscriber to the facsimile store and forward network;

providing a data communication connection between the first facsimile machne and the inbound node for transmitting the message data from the first fascimile machine to the inbound node;

transmitting the second public switched telephone network address signal and message data from the inbound node to an outbound node of the facsimile store and forward network;

transmitting the second public switched telephone network address signal from the outbound node to the second public switched telephone network to access the second facsimile machine; and upon accessing the second facsimile machine, transmitting the message data from the outbound node to the second facsimile machine.

2. The method of claim 1 in which the inbound node includes a message data processor to which the subscriber identification signal transmitted to the address processing unit is transferred for confirmation that the first facsimile machine is a subscriber to the store and forward network.

3. The method of claim 1 in which each of the network access device and the address processing unit includes a dual tone multifrequency tone generator and a dual tone multifrequency tone detector for respectively generating and demodulating the signals transmitted between the network access device and the address processing unit.

4. The method of claim 1 in which the first facsimile machine is adapted primarily for standard point-to-point facsimile communication and the network access device is separate from the first facsimile machine.

5. In a facsimile store and forward network that includes an inbound node that communicates with a first public switched telephone network and is accessed by a first public switched telephone network address signal for receiving message data generated by a first facsimile machine and for directing the message data to a facsimile destination that communicates with a second public switched telephone network and is accessed by a second public switched telephone network address signal, the improvement comprising:

network access means disposed in data communication between the first public swtiched telephone network and the first facsimile machine for receiving from it the second public switched telephone network address signal and in response thereto delivering the first public switched telephone network address signal to the first public switch telephone network; and address processing means providing data communication between the inbound node and the first public swithced tlephone network for cooperating with the network access device to execute an interface protocol that includes transmission of a nodal identification signal from the address processing means to the network access means to confirm that the inbound node has been accessed, transmission from the network access means to the address processsing means in response to the nodal identification signal the second public switched telephone network address signal and a subscriber identification signal identifying the first facsimile machine as a subscriber to the store and forward network, and establishment of a data communication connection between the first facsimile machine and the inbound node for transmitting the message data from the first facsimile machine to the inbound node.

6. The system of claim 5 in which the inbound node includes a message data processor to which the subscriber identification signal transmitted to the address processing means is transferred for confirmation that the first facsimile machine is a subscriber to the store and forward network.

7. The system of claim 5 in which each of the network access means and the address processing means includes a dual tone multifrequency tone generator and a dual tone multifrequency tone detector for respectively generating and demodulating the signals transmitted between the network access means and the address processing means.

8. The system of claim 5 in which the first facsimile machine is adapted primarily for standard point-to-point facsimile communication and the network access means is separate from the first facsimile machine.

9. The system of claim 5 in which the facsimile destination includes a second facsimile machine.

10. In a facsimile store and forward network that includes an inbound node that communicates with a first public switched telephone network and is accessed by a first public switched telephone network address signal for receiving message data generated by a first facsimile machine and for directing the message data to a facsimile destination that communicates with a second public switched telephone network and is accessed by a second public switched telephone network address signal, a method of transmitting the message data from the first facsimile machine to the facsimile destination, comprising:

directing the second public switched telephone network address signal from the first facsimile machine to a network access device disposed in data communication between the first facsimile machine and the first public switched telephone network;

transmitting the first public switched telephone network address signal from the network access device to the first public switched telephone network to access the inbound node;

transmitting a nodal identification signal to the network access device from an address processing unit within the inbound node and in data communication with the first public switched telephone network, the nodal identification signal confirming that the inbound node has been accessed;

transmitting from the network access device to the address processing unit the second public swithced telephone network address signal and a subscriber identification signal identifying the first facsimile machine as a subscriber to the facsimile store and forward network; and providing a data communication connection between the first facsimile machine and the inbound node for transmitting the message data from the first facsimile machine to the inbound node.

11. The method of claim 10 in which the inbound node includes a message data processor to which the subscriber identification signal transmitted to the address processing unit is transferred for confirmation that the first facsimile machine is a subscriber to the store and forward network.

12. The method of claim 10 in which each of the network access device and the address processing unit includes a dual tone multifrequency tone generator and a dual tone multifrequency tone detector for respectively generating and demodulating the signals transmitted between the network access device and the address processing unit.

13. The method of claim 10 in which the first facsimile machine is adapted primarily for standard point-to-point facsimile communication and the network access device is separate from the first facsimile machine.

14. The method of claim 10 in which the facsimile destination includes a second facsimile machine.

* * * * *

UNITED STATES PATENT AND TRADEMARK OFFICE
CERTIFICATE OF CORRECTION

PATENT NO. : 5,014,300
DATED : May 7, 1991
INVENTOR(S) : Steven J. Harvath, Vernon O. Kilgore, and Raymond K. Zapp It is certified that error appears in the above-identified patent and that said Letters Patent is hereby corrected as shown below:

Abstract, line 13, after "corresponding" insert --to--.

Column 1, line 10, change "stop" to --store--.

Column 1, line 23 "include" should read --includes--.

Column 1, line 47, change "pont" to --point--.

Column 1, line 54, change "telepohone" to --telephone--.

Column 2, line 54, change "touch-tone" to --Touch-Tone.--

Column 2, line 64, change "requirments" to --requirement--.

Column 3, lines 1-2, change "facimile" to --facsimile--.

Column 3, line 4, change "subcribers" to --subscribers--.

Column 3, line 44, change "and" to --an--.

Column 4, line 46, change "facsmile" to --facsimile--.

Column 4, line 49, change "showning" to --showing--.

Column 4, line 51, change "a" to --an--.

Column 5, line 8, change "nad" to --and--.

UNITED STATES PATENT AND TRADEMARK OFFICE
CERTIFICATE OF CORRECTION

PATENT NO. : 5,014,300

DATED : May 7, 1991

INVENTOR(S) : Steven J. Harvath, Vernon O. Kilgore, and Raymond K. Zapp

It is certified that error appears in the above-identified patent and that said Letters Patent is hereby corrected as shown below:

Column 5, lines 32-33, change "network for voice communication. As" to --in accordance with the present invention,--.

Column 5, line 42, change "frist" to --first--.

Column 5, line 57, change "paths" to --path--.

Column 5, line 62, change "generatd" to --generated--.

Column 6, line 2, change "to control" to --to a control--.

Column 6, line 13, delete "is".

Column 6, line 46, change "ta" to --a--.

Column 6, line 48, change "internatioinal" to --international--.

Column 7, line 5, change "60 delivers" to --60 also delivers--.

Column 7, line 18, change "receving" to --receiving--.

Column 7, line 31, change "cooperates" to --cooperate--.

UNITED STATES PATENT AND TRADEMARK OFFICE
CERTIFICATE OF CORRECTION

PATENT NO. : 5,014,300
DATED : May 7, 1991
INVENTOR(S) : Steven J. Harvath, Vernon O. Kilgore, and Raymond K. Zapp It is certified that error appears in the above-identified patent and that said Letters Patent is hereby corrected as shown below:

Column 7, line 39, change "showning" to --showing--.

Column 8, line 24, change "circusstances" to --circumstances--.

Column 8, line 31, change "nad" to --and--.

Column 9, line 16, change "rign" to --ring--.

Column 9, line 23, change "form" to --from--.

Column 9, line 26, change "arrangment" to --arrangement--.

Column 9, line 32, change "idfentication" to --identification--.

Column 10, line 2, change "built" to --bulk--.

Column 10, lines 5-6, change "informatoin" to --information--.

Column 10, lines 6-7, change "subscsriber" to --subscriber--.

Column 10, line 34, change "adress" to --address--.

Column 10, line 44, change "inlcude" to --include--.

UNITED STATES PATENT AND TRADEMARK OFFICE
CERTIFICATE OF CORRECTION

PATENT NO. : 5,014,300
DATED : May 7, 1991
INVENTOR(S) : Steven J. Harvath, Vernon O. Kilgore, and Raymond K. Zapp It is certified that error appears in the above-identified patent and that said Letters Patent is hereby corrected as shown below:

Column 11, line 31, change "singals area" to --signals are--.

Column 11, line 53, change "inforamtoin" to --information--.

Column 11, line 56, change "tansmits" to --transmits--.

Claim 1, column 12, line 39, change "comfirming" to --confirming--.

Claim 1, column 12, line 49, change "machne" to --machine--.

Claim 1, column 12, lines 50-51, change "fascimile" to --facsimile--.

Claim 5, column 13, line 23, change "swtiched" to --switched--.

Claim 5, column 13 line 32 "swithced tlephone" should read --switched telephone--.

Claim 5, column 13, line 40, change "signal" to --signal,--.

UNITED STATES PATENT AND TRADEMARK OFFICE
CERTIFICATE OF CORRECTION

PATENT NO. : 5,014,300

DATED : May 7, 1991

INVENTOR(S) : Steven J. Harvath, Vernon O. Kilgore, and Raymond K. Zapp

It is certified that error appears in the above-identified patent and that said Letters Patent is hereby corrected as shown below:

Claim 10, column 14, line 33, change "swithced" to --switched--.

Signed and Sealed this

Twenty-fourth Day of November, 1992

*Attest:*

DOUGLAS B. COMER

*Attesting Officer*  Acting Commissioner of Patents and Trademarks